United States Patent
Costello et al.

[11] 3,945,805
[45] Mar. 23, 1976

[54] REACTOR-GENERATOR APPARATUS

[75] Inventors: Norman F. Costello; Neal A. Cook, both of Racine, Wis.

[73] Assignee: Modine Manufacturing Company, Racine, Wis.

[22] Filed: Apr. 18, 1974

[21] Appl. No.: 461,856

[52] U.S. Cl. .................................. 23/290; 23/284
[51] Int. Cl.² .......................... B01J 3/04; B01J 1/00
[58] Field of Search .......... 23/288 L, 289, 290, 284; 138/37, 40, 42, 114; 165/142; 122/318, 319

[56] References Cited
UNITED STATES PATENTS

| | | |
|---|---|---|
| 1,893,492 | 1/1933 | Brill ................................. 23/289 X |
| 2,887,365 | 5/1959 | Rycker et al. ..................... 23/289 X |
| 3,002,816 | 10/1961 | Friend et al..................... 23/289 UX |
| 3,149,176 | 9/1964 | Glazier et al. ..................... 23/290 X |
| 3,313,599 | 4/1967 | Boon..................................... 23/290 |
| 3,547,890 | 12/1970 | Yamada et al..................... 23/284 X |

*Primary Examiner*—Joseph Scovronek
*Assistant Examiner*—Arnold Turk
*Attorney, Agent, or Firm*—Wegner, Stellman, McCord, Wiles & Wood

[57] ABSTRACT

A high temperature reactor-generator apparatus for the high temperature conversion of a reactant stream of which reforming hydrocarbons into gaseous products, dissociating ammonia, partial oxidation of hydrocarbon feeds, high temperature catalytic reforming and the like are examples. The apparatus comprises a pressure vessel, a conduit within the vessel having upper and lower ends and sides spaced from the pressure vessel walls, a partition intermediate the ends of the conduit member and spanning the space between the vessel and the conduit member to divide the interior of the vessel into an upper reactor chamber and lower reactor chamber, means for introducing a fluid reactant into the lower chamber for flow therethrough and upwardly through the conduit into the upper reactor chamber, a heat supply for heating the lower reactor chamber, a reaction products outlet from the upper chamber and means for supplying heat to the lower reactor chamber for causing the reaction. The means for flowing a fluid in heat exchange relationship with the upper reactor chamber may take any form desired such as a fluid coil in the upper chamber or an injector for injecting the fluid directly into contact with the fluids in the upper chamber.

7 Claims, 2 Drawing Figures

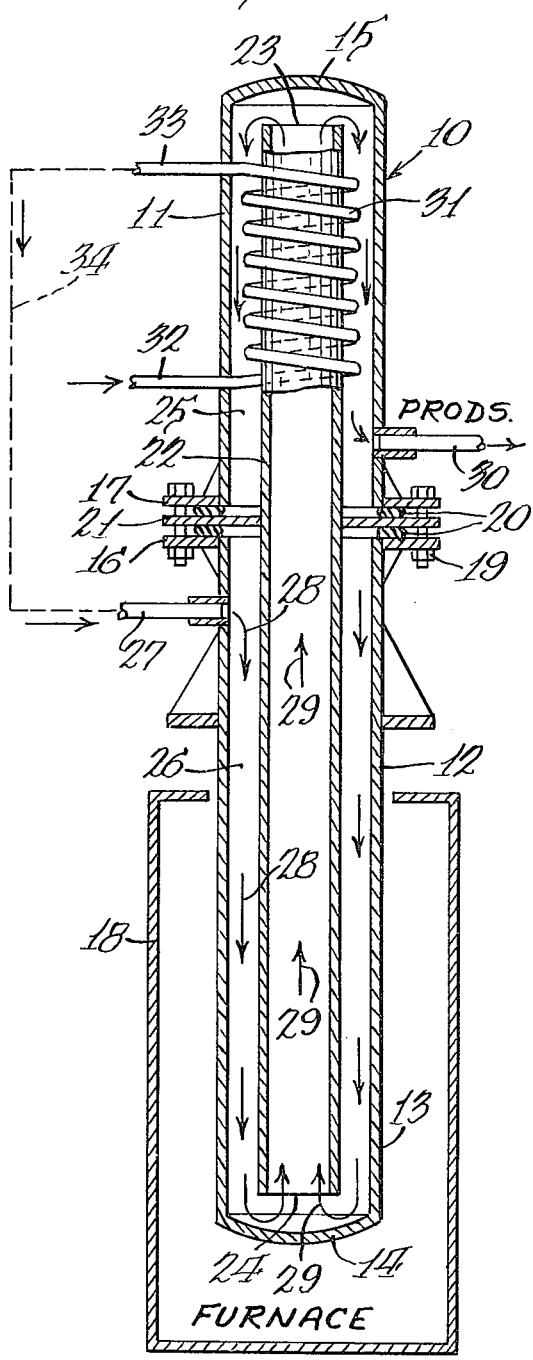
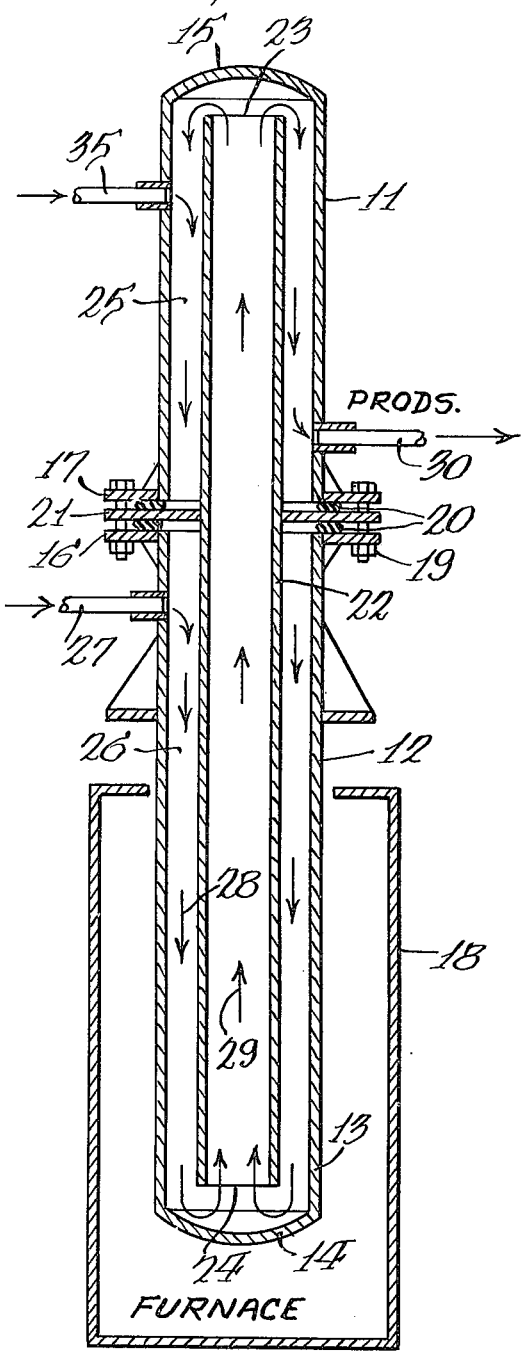

REACTOR-GENERATOR APPARATUS

BACKGROUND OF THE INVENTION

This invention relates to a high temperature reactor-generator apparatus for providing gaseous reaction products in which a pressure vessel is separated into upper and lower reactor chambers connected by a conduit within the vessel communicating with both chambers and arrangements for introducing a heat exchange fluid in heat exchange relationship with the upper reactor chamber.

BRIEF DESCRIPTION OF THE DRAWINGS

FIG. 1 is a vertical sectional view of one embodiment of the apparatus of this invention with a portion being in side elevation.

FIG. 2 is a view similar to FIG. 1 but illustrating a second embodiment of the invention.

DESCRIPTION OF THE PREFERRED EMBODIMENTS

The apparatus of this invention includes a reactor 10 that is generally similar to the one shown, described and claimed in our copending application Ser. No. 447,503, filed Mar. 4, 1974. This reactor as illustrated in both figures of this application comprises a pressure vessel 11 that in these embodiments is vertically elongated and including an integral section 12 comprising a cylinder 13 provided with a bottom 14.

At the top of the vessel 11 is a cap section 15 that is provided with an annular mounting flange 17 which cooperates with a parallel mounting flange 16 on the adjacent end of the cylindrical section 13. The lower end of this cylindrical section 13 is in communication with a furnace shown schematically at 18 for receiving heat therefrom.

The cylindrical section 13 and the cap section 15 are resiliently connected together by spaced bolts 19 that interconnect the mounting flanges 16 and 17 and press the flanges 16 and 17 against resilient gaskets 20 that are on opposite sides of a mounting flange 21 that is attached to a vertical conduit or tube 22. This tube has a top end 23 adjacent to the cap section 15 and a bottom end 24 that is adjacent to the bottom 14 of the pressure vessel 11.

As can be seen from this description and the accompanying drawings the pressure vessel 11 is defined by walls including the side walls of the cap section 15 and the aligned side walls of the bottom section 13. The conduit or tube 22 within the vessel has the upper 23 and lower 24 ends and its cylindrical sides spaced from these pressure vessel walls. These ends of the tube are open for fluid flow therethrough as indicated by the arrows in FIGS. 1 and 2.

The mounting flange 21 for the tube functions as a partition intermediate the upper and lower ends that span the reactor space defined by the pressure vessel 11 and tube 22 that divides the space into an upper reactor chamber 25 and lower reactor chamber 26.

The apparatus includes means illustrated by the pipe 27 for introducing a fluid reactor medium into the lower reactor chamber 26 for flow through this chamber as indicated by the arrows 28 and then upwardly through the conduit member or tube 22 as indicated by the arrows 29. This flow upwardly through the tube 22 is into the upper chamber 25 by way of the open upper end 23 of the tube.

The furnace 18 supplies heat to the lower end of the apparatus and means comprising the tube 30 are provided for removing the reaction products from the upper reactor chamber 25.

The apparatus is also provided with means for flowing a fluid in heat exchange relationship with the upper reactor chamber 25. In one embodiment of FIG. 1 this means comprises a helical coil 31 arranged around the tube 22 within the upper reactor chamber 25 and substantially concentric with but spaced from the tube and the cap section 15 and thus with the pressure vessel 11. This coil 31 has an inlet 32 and an outlet 33 so that passage of a fluid through the coil 31 is in heat exchange relationship with the fluids in the upper reactor chamber 25. This not only serves to heat the fluid flowing through the coil 31 but also to cool the reaction products before they leave the reactor through the pipe 30. This of course greatly simplifies the external cooling requirements that would be necessary to cool the reaction products.

The heated fluid flowing from the coil 31 through the outlet 33 may be disposed of in any manner desired. As is illustrated by the dotted line 34 this fluid may be a reactant such as water which is directed into the lower reactor chamber 26 along with the other reactants that are introduced by way of the pipe 27. Thus the dotted line 34 is merely a schematic illustration of a manner in which the heated fluid from the coil 31 may be utilized.

In FIG. 2 the structure is exactly the same as FIG. 1 except in the FIG. 2 embodiment the heating coil 31 is replaced with a pipe 35 which functions as an inlet fitting for introducing a cooling medium such as water or a fluid reactant of which water may be an example directly into the upper chamber 25 for direct contact with the reaction product fluids therein. In this embodiment the direct contact of the fluids is achieved in the upper reactor chamber 25. If desired, of course, this direct contact could be achieved initially in the reaction by merely changing the location of the inlet fitting 35 from the upper chamber 25 to the lower chamber 26 and preferably in the vicinity of the main reactant inlet pipe 27.

One advantage of injecting the fluid through the pipe 35 into the upper chamber 25 is that the injected fluid will then be introduced later in the reaction or as illustrated in FIG. 2 in the final stage of the reaction. Thus this will be done without permitting the injected fluid to fall into the lower reactor chamber 26 which is separated from the upper chamber by the tube mounting flange 21.

One of the important advantages of this invention is that the apparatus is ideally usable for the generation of oil-gas with a given range of feed stocks because this apparatus provides two separated reaction zones which permit different processes to occur in series in the two zones. Thus the initial reaction will take place in the bottom reactor chamber 26, will continue while flowing downwardly and then initially through the tube 22 with the reactants receiving heat from the furnace and then continuing the reaction in a final chamber illustrated by the upper reactor chamber 25. Thus with this apparatus ideal temperatures can easily be maintained throughout the reactor to promote the best reaction or in the oil and gas example to provide the best ratio of carbon, hydrogen and oxygen produced. This proper temperature can, of course, be maintained by proper heat input, a controlled heat transfer surface area, a calculated cooling medium flow inside of the apparatus and other controllable variables, all as well known to those skilled in the art. Typical temperatures within the apparatus may vary from about 1000° to as much as 2500°F. or even lower or higher where such temperatures are required in the particular process.

Typical uses of the high temperature reactor-generator apparatus of this invention are for reforming hydrocarbons into gaseous fuel products or feed stocks, dissociation of ammonia, partial oxidation of distillable and gaseous hydrocarbon feeds, high temperature catalytic reforming and the like.

The illustrated embodiment in the drawings shows only a single stage reactor. It is evident, however, to those skilled in the art that the invention may be readily applied to reactors in which a plurality of reactors are used either in parallel, series or parallel and series combined gas generating operations.

Furthermore, although the vessel is shown in generally upright position the reactor could also be used inverted from the posistion of the drawing or in horizontal or annular position.

Having described our invention as related to the embodiments shown in the accompanying drawings, it is our intention that the invention be not limited by any of the details of description, unless otherwise specified, but rather be construed broadly within its spirit and scope as set out in the appended claims.

We claim:

1. A high temperature reactor-generator apparatus, comprising: a pressure vessel defined by walls including side walls, said vessel including a lower section and an upper section; a conduit member within said vessel having sides spaced from the pressure vessel walls and open upper and lower ends; a combined partition means and mounting flange for said conduit member located intermediate to said upper and lower ends of said conduit member and extending to said side walls and spanning the space between the vessel and the conduit member for dividing the vessel into an upper reactor chamber located laterally outwardly of said conduit member upper end and a lower reactor chamber, said lower section and said upper section comprising said lower and upper reactor chamber; resilient sealing means for resiliently sealing together said partition means and said upper and lower vessel sections; means for introducing a fluid reactant medium into said lower reactor chamber for flow therethrough and upwardly through said conduit member into said upper reactor chamber; means for supplying heat to said lower reactor chamber; means for removing reaction products from said upper reactor chamber; and means for flowing a fluid in heat exchange relationship with said upper reactor chamber.

2. The apparatus of claim 1 wherein said means for introducing said fluid comprises a helical coil in said upper reactor chamber having an inlet and an outlet and comprising means for preheating said reactant medium, said coil outlet communicating with said lower reactor chamber for introducing said reactant medium thereto.

3. The apparatus of claim 1 wherein said upper reactor chamber is provided with an inlet fitting for introducing a cooling medium into said upper reactor chamber for direct contact with the contents thereof.

4. The apparatus of claim 1 wherein said vessel and said conduit member are essentially vertical, said means for introducing said fluid reactant member is located adjacent the top of said lower reactor chamber and said means for removing said reaction products is located adjacent the bottom of said upper reactor chamber.

5. The apparatus of claim 1 wherein said means for flowing said fluid comprises a conduit in said upper chamber.

6. The apparatus of claim 5 wherein said conduit comprises a coil located in said upper reactor chamber surrounding said conduit member.

7. The apparatus of claim 6 wherein said coil is substantially concentric with said conduit member and said pressure vessel.

* * * * *